(12) United States Patent
Liu et al.

(10) Patent No.: US 9,510,232 B2
(45) Date of Patent: Nov. 29, 2016

(54) CELLULAR NETWORK BACKHAUL OVERSUBSCRIPTION

(71) Applicant: T-Mobile USA, Inc., Bellevue, WA (US)

(72) Inventors: Chunming Liu, Bellevue, WA (US); Bryan Fleming, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 148 days.

(21) Appl. No.: 14/327,086

(22) Filed: Jul. 9, 2014

(65) Prior Publication Data

US 2016/0014634 A1    Jan. 14, 2016

(51) Int. Cl.
| H04J 1/16 | (2006.01) |
| H04W 28/02 | (2009.01) |
| H04W 28/10 | (2009.01) |
| H04W 24/08 | (2009.01) |
| H04L 12/26 | (2006.01) |
| H04W 24/02 | (2009.01) |

(52) U.S. Cl.
CPC ...... *H04W 28/0289* (2013.01); *H04L 43/0888* (2013.01); *H04W 24/08* (2013.01); *H04W 28/0284* (2013.01); *H04W 28/10* (2013.01); *H04W 24/02* (2013.01)

(58) Field of Classification Search
CPC .......... H04W 28/10; H04W 28/0289; H04W 28/0284; H04W 24/02
USPC ........................................................ 370/232
See application file for complete search history.

(56) References Cited

U.S. PATENT DOCUMENTS

| 5,132,961 A | 7/1992 | Thiebaut et al. |
| 6,912,575 B1 | 6/2005 | Swift et al. |
| 8,542,586 B2 | 9/2013 | Chen et al. |
| 2004/0184477 A1 | 9/2004 | Tavli et al. |
| 2008/0002720 A1 | 1/2008 | Chao et al. |
| 2010/0208588 A1 | 8/2010 | Vinokour et al. |
| 2010/0220724 A1 | 9/2010 | Rabie et al. |
| 2010/0220731 A1 | 9/2010 | Diab et al. |
| 2011/0058656 A1* | 3/2011 | Hartwich ............. A61B 6/4405 378/198 |

(Continued)

FOREIGN PATENT DOCUMENTS

| WO | WO2008022459 A1 | 2/2008 |
| WO | WO2010051242 A1 | 5/2010 |
| WO | WO2014089770 A1 | 6/2014 |

OTHER PUBLICATIONS

PCT Search Report and Written Opinion mailed Oct. 14, 2015 for PCT Application No. PCT/US15/39324, 10 pages.

(Continued)

*Primary Examiner* — Mang Yeung
(74) *Attorney, Agent, or Firm* — Lee & Hayes, PLLC

(57) ABSTRACT

Methods and computing systems for determining a committed information rate for a plurality of cell sites are described. Data associated with throughput of combined voice and data traffic communicated between a core network and the plurality of cellular sites is received. An oversubscription ratio for the committed information rate is determined based on a predetermined service outage threshold and a plurality of peak throughput values of the combined voice and data traffic over a plurality of time periods. An oversubscribed committed information rate for the plurality of cellular sites is determined based on the oversubscription ratio.

20 Claims, 4 Drawing Sheets

(56) References Cited

U.S. PATENT DOCUMENTS

| | | |
|---|---|---|
| 2011/0200017 A1 | 8/2011 | Amalfitano |
| 2012/0013748 A1* | 1/2012 | Stanwood ............ H04L 41/5022 348/192 |
| 2012/0027014 A1 | 2/2012 | Mack-Crane et al. |
| 2013/0121261 A1 | 5/2013 | Yao et al. |
| 2013/0142055 A1 | 6/2013 | Bao et al. |
| 2013/0223287 A1 | 8/2013 | Ahmad |
| 2013/0275597 A1 | 10/2013 | Feng et al. |
| 2014/0082193 A1 | 3/2014 | Bugenhagen |
| 2014/0177840 A1* | 6/2014 | Liu ....................... H04W 28/08 380/270 |
| 2014/0233423 A1 | 8/2014 | Jha et al. |
| 2015/0188773 A1 | 7/2015 | DeCusatis et al. |
| 2016/0182255 A1 | 6/2016 | Liu et al. |
| 2016/0183118 A1 | 6/2016 | Liu et al. |

OTHER PUBLICATIONS

PCT Search Report and Written Opinion mailed Mar. 25, 2016 for PCT Application No. PCT/US15/65030, 9 pages.

PCT Search Report and Written Opinion mailed Apr. 18, 2016 for PCT Application No. PCT/US15/64490, 12 pages.

Office action for U.S. Appl. No. 14/575,338, mailed on Jun. 16, 2016, Liu et al., "Tunneling with Routing for Transport Network", 17 pages.

Office action for U.S. Appl. No. 14/575,451, mailed on Jun. 30, 2016, Liu et al., "Dynamic Bandwidth Scheduling with Transport Network", 21 pages.

* cited by examiner

CELLULAR NETWORK BACKHAUL OVERSUBSCRIPTION

BACKGROUND

Mobile network operators utilize Alternative Access Vendors (AAVs) where the operator's network does not extend to a mobile cellular location. The AAV provides a wide area networking network interface (e.g., a user network interface, or "UNI") and provides a virtual circuit between the mobile cellular location and the carrier's core network. The networking interface may be Carrier Ethernet, Multi-protocol Label Switching (MPLS), Frame Relay, Asynchronous Transfer Mode (ATM), or other interface type that supports virtual circuits or virtual channels (VC).

A VC is provisioned with a committed data rate (CDR), also called a committed information rate (CIR), which is specified in a service level agreement (SLA). In the SLA, the AAV typically promises to deliver at least a certain percentage of packets or frames transmitted below the CIR, usually 99% or 99.9% of frames. The amount of CIR specified in the SLA is often tied to the cost of the AAV's service, with a higher CIR costing more money. A peak information rate (PIR) is the maximum burst speed allowed on the VC, with packets that exceed the CIR being a "best effort" and therefore non-guaranteed. The carrier and the AAV typically employ policers at the UNI handoff to monitor and shape throughput to conform to the CIR and/or PIR.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The disclosure describes herein a method for determining an oversubscription factor for a committed information rate (CIR) of a virtual circuit in a data backhaul network that links a cluster of cellular sites to a carrier core network. To provide a backhaul network to a cellular site cluster, a conventional approach is to provision separate VCs, each with a separate CIR, for each cell site, with each CIR selected to meet each individual cell site's peak observed throughput. But because network traffic for each cell site is not correlated with traffic from other cell sites within the cluster, the actual observed aggregate peak network traffic for the cluster is usually less than the sum of the CIRs for each of the cell sites. Thus, the present disclosure describes providing a single VC for a plurality of cell sites, with the VC having a CIR that is oversubscribed, i.e., less than the sum of the CIRs that would be selected were individual VCs provisioned for each cell site. Embodiments of the present disclosure include methods for determining the oversubscription ratios for a VC for a cell cluster.

Overview

Figure 1:
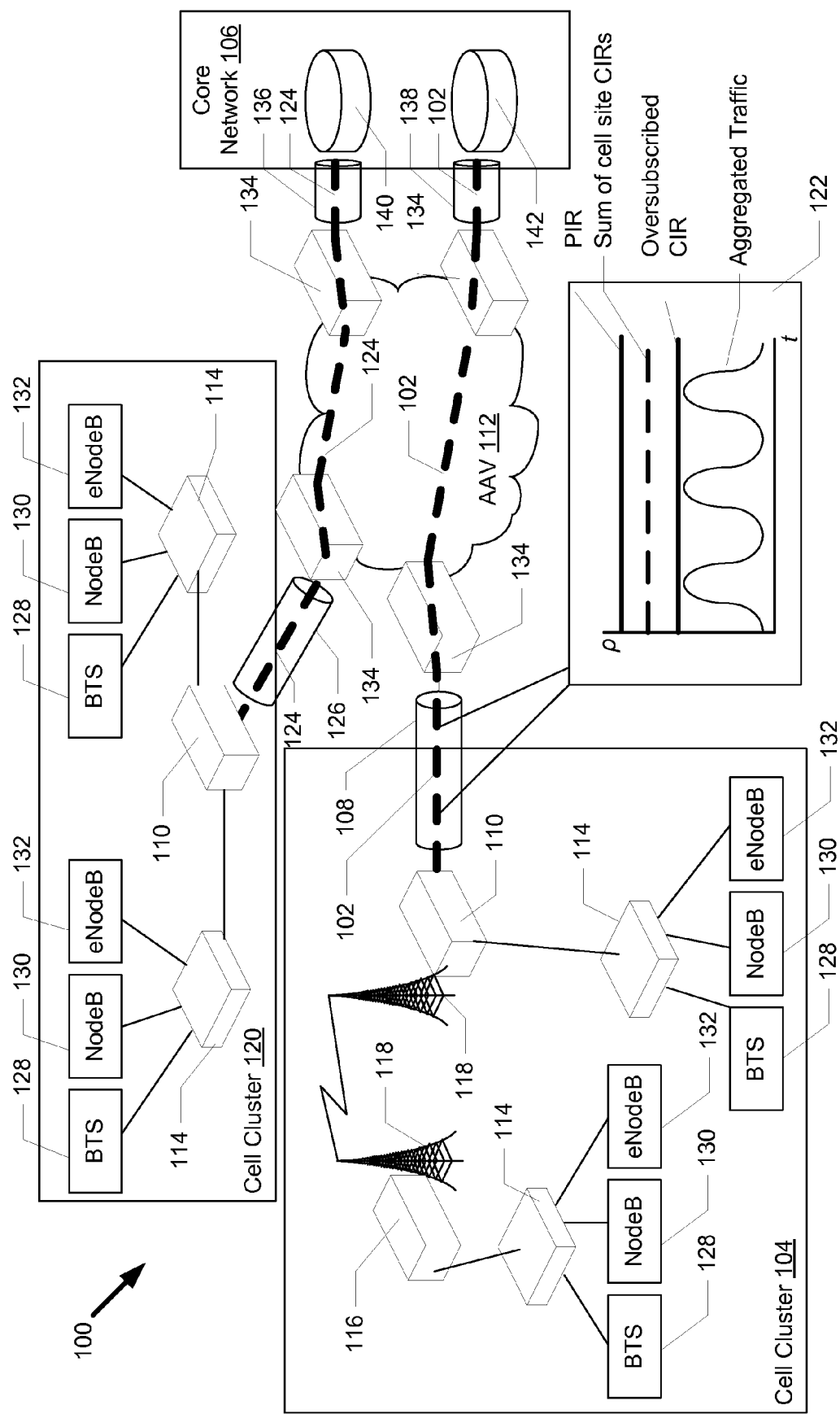
FIG. 1 illustrates a backhaul network having a virtual circuit with an oversubscribed committed information rate (CIR) to connect a plurality of cell sites within a cell cluster to a core network.

FIG. 1 illustrates a backhaul network 100 having a virtual circuit 102 with an oversubscribed committed information rate (CIR) to connect a plurality of cell sites within a cell cluster 104 to a core network 106. The virtual circuit 102 is provided to the cell cluster 104 via a user network interface (UNI) 108. The UNI terminates at hub customer premise equipment (CPE) 110, which may be a switch, router, or other device configured to terminate a UNI. A network carrier, e.g., an alternative access vendor (AAV) 112, provides the virtual circuit 102.

The cell cluster 104 includes a plurality of cell sites, each separately connected to the hub CPE 110 via a cluster router 114 and/or cluster switch 116 (other devices may be used without departing from the scope of embodiments). The cell cluster 104 illustrated in FIG. 1 is a microwave cluster with one cell site coupled to the hub CPE 110 via microwave equipment 118. The cell cluster 120 illustrated in FIG. 1 is a distributed antenna system (DAS) that provides wireless connectivity between the hub CPE 110 and the routers 114 within a small geographical area or within a building or campus. Other examples of cell clusters, including those having microwave and DAS connectivity, are possible without departing from the scope of embodiments.

Embodiments of the present disclosure include an oversubscribed CIR on the virtual circuit 102. Voice and data traffic throughput from one cell site within the cell cluster 104 is not correlated with voice and data traffic throughput from the other cell sites within the cluster 104. The actual observed peak throughputs of the aggregated traffic shown in chart 122 is therefore lower than the sum of the individual peak throughputs for each of the cell sites in the cluster. Thus, based on the peak aggregated throughput values observed at the hub CPE 110, an oversubscription ratio is determined, and an oversubscribed CIR is provisioned for the virtual circuit 102 based on the oversubscription ratio. A peak information rate (PIR) is also provisioned for the VC 102.

Similarly, an oversubscription ratio and an oversubscribed CIR are determined for a virtual circuit 124 provided to cell cluster 120 via UNI 126.

The cell sites illustrated in FIG. 1 are shown with a plurality of base transceiver stations (BTS) 128-132, which may be GSM, CDMA, Wi-Fi, WiMax, LTE, or other wireless transceiver station type configured to communicate with wireless end-user devices, such as mobile telephone handsets, tablet computers, wireless modems, personal computers, laptops, and so forth. These may be in various embodiments, a Universal Mobile Telecommunications System Third Generation (UMTS 3G) base station (e.g., a NodeB 130), a fourth generation (4G), Evolved Node B (eNodeB 132), or other device. Each cell site may include one or more BTS type, and therefore support more than one type of voice and/or data connections for wireless end-user devices. The AAV 112 provides UNI 108 and UNI 126 via provider edge devices 134, with UNI 136 and UNI 138 terminated on core network devices 140 and 142, respectively. The core network devices may be switches, routers, or other devices capable of terminating a UNI.

The base station transceivers 128-132 provide wireless communications to end-user devices by employing any combination of common wireless broadband communication technologies, including, but not limited to, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax technology, or WiFi technology. Further, the AAV 112 network may employ any common wireline communication technology, including but not limited to, optical fiber, coaxial cable, twisted pair cable, Ethernet cable, and power-line cable, along with any common wireless communication technology, such as those described above.

Although FIG. 1 illustrates cell clusters that are aggregated using a single VC, embodiments also include some plurality of cell sites within the cell cluster aggregated onto a single VC, with other cell sites within the cluster aggregated on other VCs. Generally, embodiments include a plurality of cell sites having combined voice and data traffic aggregated onto a single VC with an oversubscribed CIR.

Figure 2:
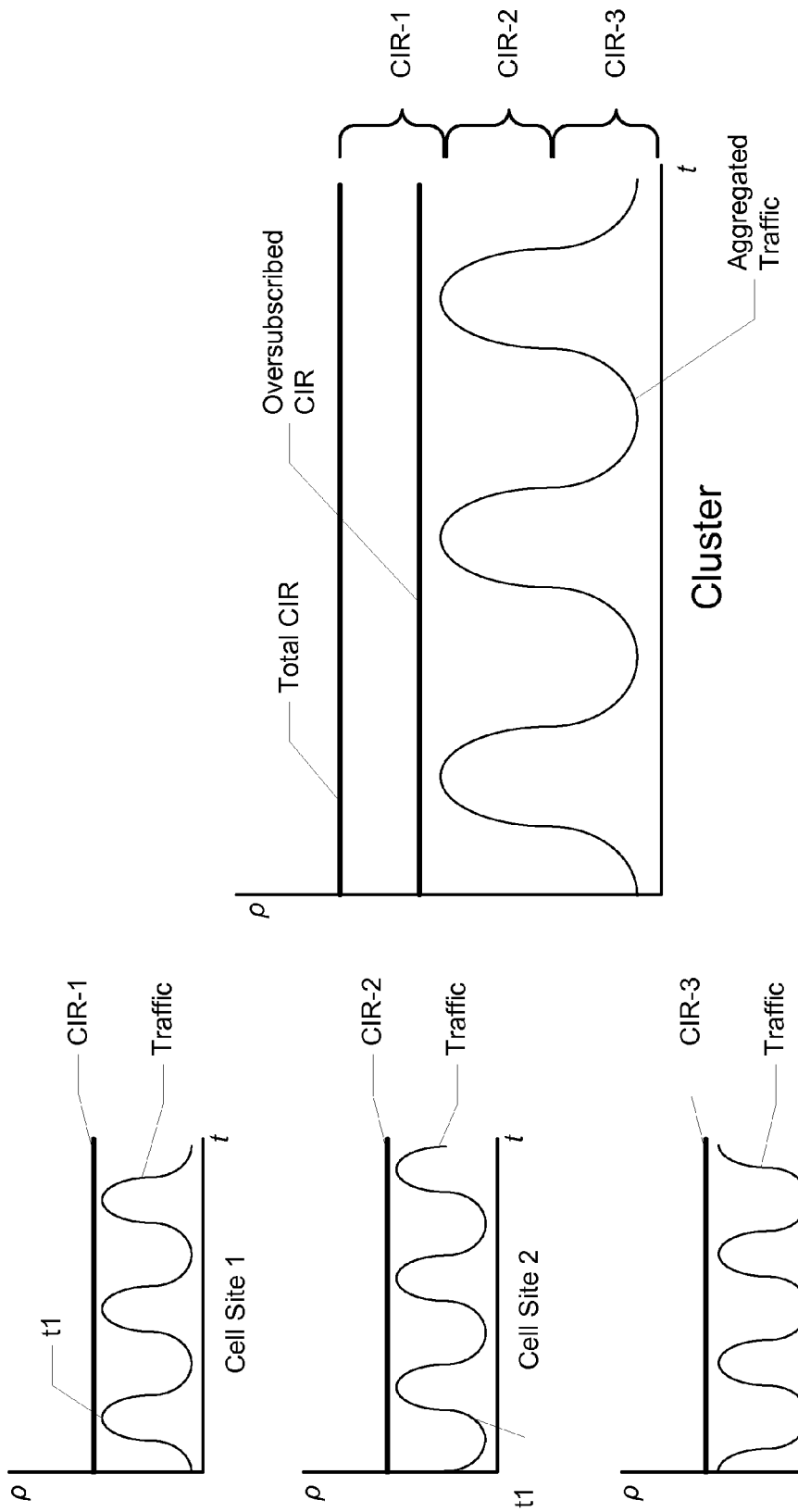
FIG. 2 visualizes aggregated traffic and illustrates an oversubscribed CIR that meets an adequate service quality threshold.

FIG. 2 visualizes aggregated traffic and illustrates an oversubscribed CIR that meets an adequate service quality threshold. One way to implement a VC for a cluster of cell sites is to determine, from observed peak voice and data traffic throughput for each cell site, a CIR for each cell site. The individual CIRs are then summed together to arrive at a total CIR for the VC. However, although embodiments set initial CIRs for a VC based on a sum of individual cell site peak throughputs, an oversubscribed CIR is determined for the VC based on observed aggregated traffic for the cell cluster as a whole. As illustrated in FIG. 2, individual CIRs for each of cell site 1, 2, and 3 are determined for each of those cell sites based on observed peak throughput values for the individual cell sites. Summing these three CIRs results in the Total CIR depicted in the Cluster graph. The Total CIR is used as an initial CIR in various embodiments.

Because the combined voice and data traffic corresponding to each cell site are uncorrelated from one another, the observed throughput peaks for the traffic aggregated at the cell cluster hub are consistently less than the Total CIR in the Cluster graph. For example, at time t=1 each of cell sites 1, 2, and 3 have different throughputs. A t=1, cell site 1 experiences a peak throughput, while cell sites 2 and 3 experience less than peak throughputs. Thus, provisioning a CIR equal to a sum of the peak throughputs observed for the individual cell sites results in a greater CIR (e.g., the Total CIR) than the oversubscribed CIR that embodiments utilize to meet an adequate service threshold for the cluster as a whole.

An oversubscribed CIR, based on the observed peak throughput of the aggregated traffic for the plurality of cell sites, is provisioned for the VC. This oversubscribed CIR meets the service level threshold for the Cluster as a whole, thereby saving costs.

Oversubscription Determination

A cell cluster, such as the cell cluster 104, or more generally a plurality of cell sites that are aggregated together on a single VC (such as VC 102), includes a total G cell sites (where G>1). Backhaul traffic throughput of the cell sites can be assumed to be uncorrelated with the traffic throughput of the other cell sites, and it can be further assumed that all traffic from the G cell sites can be classified into two major traffic patterns: the Poisson-based model and self-similar model. The Poisson-based traffic model is used to represent cellular voice connections, while the self-similar model is used to represent data service with bursty throughput. An ON-OFF source model can be used to analyze peak throughput of a voice connection, where the ON and OFF states represent the active and silent conditions of the voice connection, respectively. Both ON and OFF state intervals are assumed to be exponentially distributed, and $R_j$ is a constant packet generation rate of voice class j in the ON state. Due to bursty packet characteristics of data services and CIR throttling on backhaul capacity, the throughput $\rho_j$ of self-similar service class j follows truncated Pareto distribution with the following probability distribution function:

$$f(\rho_j) = \frac{\alpha_j L_j^{\alpha_j} \rho_j^{-\alpha_j - 1}}{1 - (L_j/H_j)^{\alpha_j}} \quad (1)$$

where $\alpha_j$ denotes a shape parameter, $L_j$ denotes the minimal traffic rate, and $H_j$ denotes the maximum traffic rate of service class j, respectively.

The aggregated traffic throughput $\pi_{UNI}$ at UNI at time t, is as follows:

$$\rho_{UNI}(t) = \sum_{i=1}^{G} \sum_{j=1}^{M+N} \sum_{k=0}^{E_{i,j}(t)} \rho(i,j,j,t) \quad (2)$$

$$\leq \sum_{i=1}^{G} \sum_{j=1}^{M} E_{i,j}(t) \cdot R_j + \sum_{i=1}^{G} \sum_{j=N+1}^{M+N} \sum_{k=0}^{E_{i,j}(t)} \rho(i,j,k,t) \quad (3)$$

where the first part in equation (3) represents maximum throughput from all voice traffic and is a constant value, while the second part is the aggregated throughput of all data traffic. G is the total number of cell sits, $R_j$ is a constant packet generation rate of voice class j in the ON state, $E_{i,j}(t)$ is the total connection number of class j in cell i. And $\rho(i,j,k,t)$ denotes throughput at time t of a connection k which is class-j and in cell i.

The sum of self-similar traffic following a truncated Pareto distribution can be approximated as a Gaussian distribution, with mean value $\mu_{peak}$ and deviation $\sigma_{peak}$. So once the throughput distribution at a UNI is known, the peak throughput distribution through an upper boundary of a Q function can be determined. When an overbooking ratio $O_{uni}$ is applied to an initial UNI CIR equal to $\sum_{i=1}^{G} CIR(i)$, it is expected that maximum throughput will be within an acceptable outage probability range, i.e., $$P(\rho_{UNI} \leq O_{uni} \times \sum_{i=1}^{G} CIR(i)) \geq \epsilon \quad (4)$$

where $\epsilon$ is the service outage threshold, and $0<\epsilon<<1$. Since $\rho_{UNI}$ follows Gaussian distribution, then:

$$O_{uni} = \frac{\sigma_{peak} \times Q^{-1}(\epsilon) + \mu_{peak}}{\sum_{i=1}^{G} CIR(i)} \quad (5)$$

where $Q^{-1}(\epsilon)$ is the inverse function of Q(x) and $$Q(x) = \frac{1}{2\pi} \int_{x}^{\infty} e^{-\frac{s^2}{2}} ds.$$

Thus, to determine an oversubscription factor or ratio, throughput of the aggregated traffic of combined voice and data traffic is observed. Then from the peak throughput distribution, the oversubscription ratio that meets the service outage threshold $\epsilon$ is calculated using equation 5.

Example Processes

Figure 3:
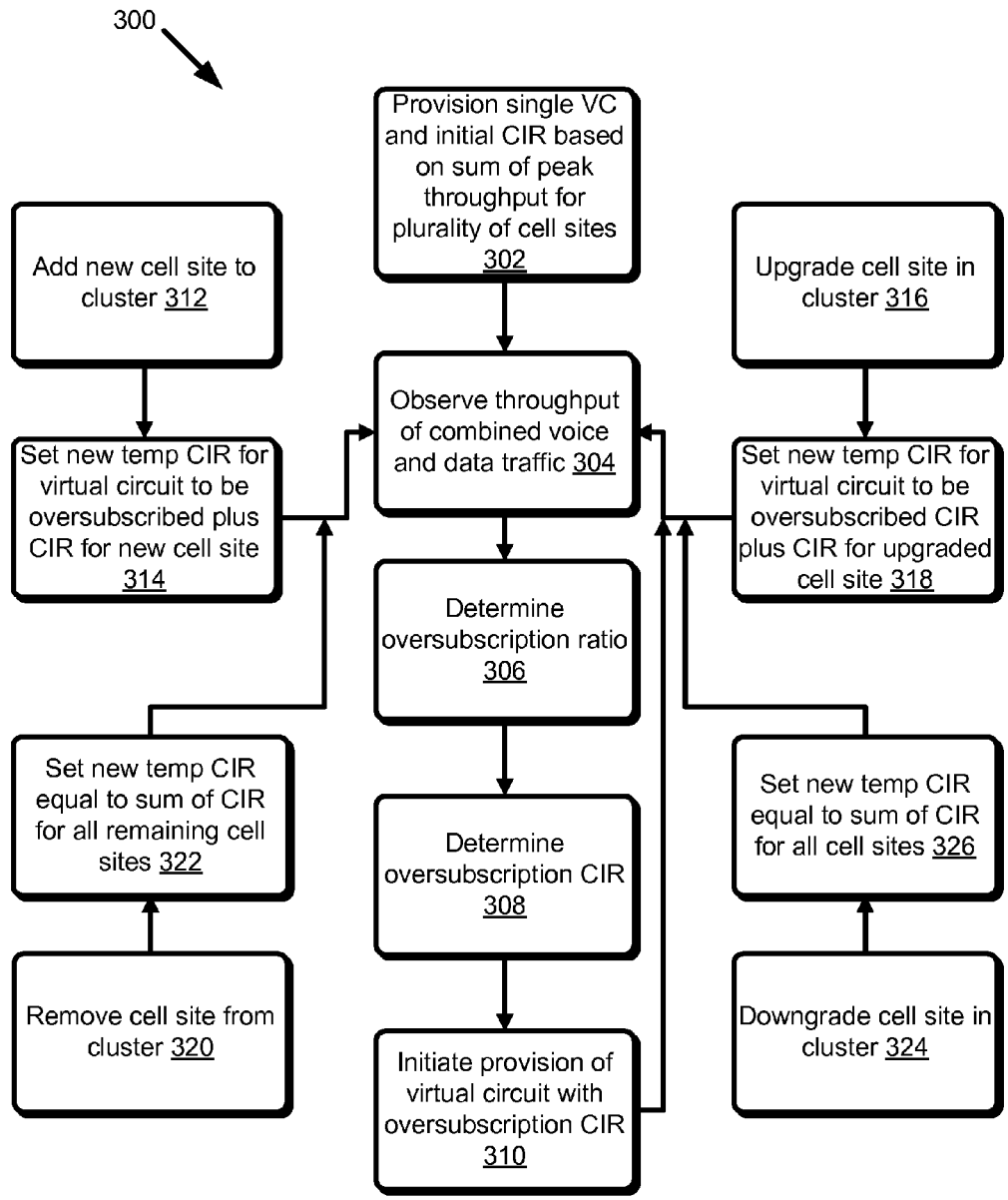
FIG. 3 illustrates a flow chart of an example process for provisioning a virtual circuit with an oversubscribed CIR for a plurality of cell sites with combined voice and data traffic.

FIG. 3 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates a flow chart of an example process 300 for provisioning a VC with an oversubscribed CIR for a plurality of cell sites with combined voice and data traffic. At 302, a VC having an initial CIR is provisioned for a plurality of cell sites within a cell cluster. The initial CIR is based on the sum of the observed peak throughputs of the individual cell sites within the plurality, e.g., the sum of the observed peak throughputs plus a safety factor. More generally, the initial CIR for the VC is equal to the sum of the CIRs that would be set individually for each cell site within the plurality of cell sites, were each cell site to be provisioned with its own VC.

At 304, observations are made of the throughput of combined voice and data traffic communicated between the core network and the plurality of cellular sites via the VC. Because the initial CIR is based on the sum of the peak throughput of the individual cell sites within the plurality, the initial CIR is adequate to carry the traffic in the observation period. Once a sufficient number of observations are made, such as over a period of several days, an oversubscription factor is determined.

At 306, an oversubscription ratio $O_{uni}$ for the committed information rate is determined based on peak throughput values for the observed aggregated combined voice and data traffic over a plurality of time periods (such as weekly peak rates, daily peak rates, or hourly peak rates). To determine an oversubscription factor or ratio $O_{uni}$, throughput of the aggregated traffic of combined voice and data traffic is observed. Then from the peak throughput values of the distribution, the oversubscription ratio that meets the service outage threshold $\epsilon$ is calculated using equation 5. The oversubscription ratio $O_{uni}$ is determined based on a mean of the peak throughput values and a standard deviation of the peak throughput values of the combined voice and data traffic.

At 308, an oversubscribed CIR is calculated using the oversubscription ratio $O_{uni} \times \Sigma_{i=1}^{G} CIR(i)$, for all cell sites i in the plurality of cell sites. As mentioned above, CIR(i) is determined from observed peak throughputs of cell site i, although other methods for determining CIR(i) are used without departing from the scope of embodiments.

At 310, provision of an oversubscribed committed information rate for a virtual circuit according to the oversubscription ratio is initiated. This may include placing an order with an AAV, or otherwise programming the AAV network to implement the oversubscribed CIR. The process of observing the throughput of combined voice and data traffic over the VC continues after an oversubscription CIR is determined, and new oversubscription rates are observed. This may include determining new CIR(i) for the individual cell sites, such as by observing the individual traffic throughput for each individual cell site. Also, the UNI maximum bandwidth may also be upgraded based on monitoring of the combined voice and data traffic for the plurality of cell sites, such as where the peak throughputs exceed a certain threshold, such as 80% of the maximum bandwidth, or other threshold.

At 312, a new cell site is added to the cluster. At 314, a temporary new committed information rate for the virtual circuit is determined. The temporary new committed information rate is determined based on the oversubscribed committed information rate and an observed peak throughput for one or more of a new cellular site being added to the cluster of cellular sites (e.g., the CIR that would be determined for the new cell site were it to be provisioned with its own VC). Further observations are made at 304 of the aggregated combined voice and data traffic for the plurality of cell sites, including the new cell site, and a new oversubscription ratio and oversubscribed CIR are determined based on observed new peak throughput values of the combined voice and data traffic of the cluster of cellular sites. Determining a new oversubscribed CIR may include determining new CIR(i) for the individual cell sites, such as by observing the individual traffic throughput for each individual cell site, including the cell sites already in the plurality of cell sites (e.g., the cell sites that are not new as well as the new cell site).

At 316, one of the cell sites in the plurality of cell sites is upgraded, such as to a new throughput capacity or to a new technology type (e.g., 3G to 4G upgrade), both, or other upgrade.

At 318, an increased committed information rate for the cluster is determined. The increased committed information rate is determined based on a sum of the oversubscribed committed information rate and observed increased throughput for the upgraded cellular site (e.g., the increased CIR that would be determined for the upgraded cell site were it to be provisioned with its own VC). Further observations are made at 304 of the aggregated combined voice and data traffic for the plurality of cell sites, including the upgraded cell site, and a new oversubscription ratio and oversubscribed CIR are determined based on observed new peak throughput values of the combined voice and data traffic of the cluster of cellular sites. Determining a new oversubscribed CIR may include determining new CIR(i) for the individual cell sites, such as by observing the individual traffic throughput for each individual cell site, including the cell sites that are not upgraded as well as the upgraded cell site.

At 320, a cell site is removed from the plurality of cell sites. At 322, a temporary new committed information rate for the virtual circuit is determined. The temporary new committed information rate is determined based on the sum of the observed peak throughput for remaining cellular sites within the plurality of cellular sites (e.g., the sum of the CIR that would be determined for the plurality of cell sites were they to be provisioned with their own VCs). Further observations are made at 304 of the aggregated combined voice and data traffic for the plurality of cell sites, and a new oversubscription ratio and oversubscribed CIR are determined based on observed new peak throughput values of the combined voice and data traffic of the cluster of cellular sites. Determining a new oversubscribed CIR may include determining new CIR(i) for the individual cell sites, such as by observing the individual traffic throughput for the cell sites that remain in the plurality of cell sites.

At 324, one of the cell sites in the plurality of cell sites is downgraded, such as to a new throughput capacity or to a new technology type (e.g., 4G to 3G downgrade), or other downgrade.

At 326, a new temporary committed information rate for the cluster is determined. The new temporary committed information rate is determined based on the observed individual cellular site throughput (e.g., the sum of the CIR that would be determined for the plurality of cell sites, including the downgraded cell site, were they to be provisioned with their own VCs). Further observations are made at 304 of the aggregated combined voice and data traffic for the plurality of cell sites, including the downgraded cell site, and a new oversubscription ratio and oversubscribed CIR are determined based on observed new peak throughput values of the combined voice and data traffic of the cluster of cellular sites. Determining a new oversubscribed CIR may include determining new CIR(i) for the individual cell sites, such as by observing the individual traffic throughput for each individual cell site, including the cell sites that are not upgraded as well as the upgraded cell site.

Example Computing System

Figure 4:
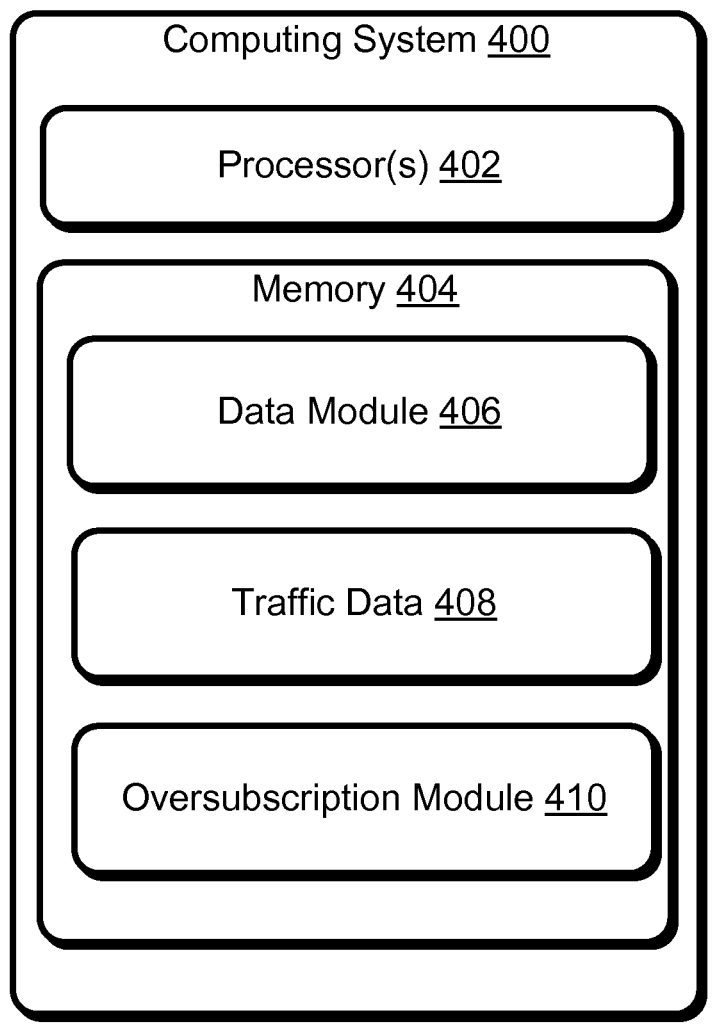
FIG. 4 illustrates an example computing system configured to determine an oversubscription CIR for combined voice and data traffic on a virtual circuit.

FIG. 4 illustrates an example computing system 400 configured to determine an oversubscription CIR for combined voice and data traffic on a virtual circuit. As illustrated in FIG. 4A, the computing system 400 includes processor(s) 402 and memory 404.

In some embodiments, the processor(s) 402 is a central processing unit (CPU), a graphics processing unit (GPU), or both CPU and GPU, or any other sort of processing unit. Each of the one or more processor(s) 402 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 402 may also be responsible for executing all computer applications stored in the memory 404, which can be associated with common types of volatile (RAM) and/or nonvolatile (ROM) memory.

In various embodiments, memory 404 may include system memory, which may be volatile (such as RAM), non-volatile (such as ROM, flash memory, etc.) or some combination of the two. The memory 404 may also include additional data storage devices (removable and/or non-removable) such as, for example, magnetic disks, optical disks, or tape.

Memory 404 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing system 400. Any such non-transitory computer-readable media may be part of the computing system 400.

The memory 404 includes a data module 406, which receives data regarding the throughput of combined voice and data traffic communicated via a VC between a plurality of mobile access sites and a core network. The data module 406 may directly monitor traffic on the VC, or it may receive traffic data 408 from another source, such as from traffic monitoring devices within the network 100. The traffic data 408 may be from a time that the VC is provisioned with an initial CIR (such as when the cell cluster is initially established), an oversubscribed CIR (e.g., constant monitoring of the plurality of cellular sites), a new temporary CIR (based for example on an upgraded or downgraded cellular site within the cluster or based on the addition or subtraction of a cellular site from the plurality of cellular sites), or other CIR as described elsewhere within this Detailed Description.

An oversubscription module 410 is configured to determine, based on peak throughput values of the combined voice and data traffic, and based on a predetermined performance threshold, an oversubscription metric for a committed information rate of the virtual circuit. In some embodiments, the oversubscription module is configured to determine the throughput peaks over a plurality of time periods (such as over hourly, daily, weekly, monthly, or other time periods). This determination may be based on a mean peak and a standard deviation of the throughput peaks, under an assumption that such peaks conform to a normal distribution. In some embodiments, the oversubscription module 410 uses an algorithm, such as equation 5 to determine an oversubscription ratio.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
  receiving, by a computing device, data associated with throughput of combined voice and data traffic communicated between a core network and a cluster of cellular sites over a virtual circuit;
  determining, by the computing device, from a predetermined service outage threshold and a plurality of peak throughput values of the combined voice and data traffic over a plurality of time periods, an oversubscription ratio for a committed information rate for the cluster of cellular sites; and
  initiating, by the computing device, a provision of an oversubscribed committed information rate for the cluster of cellular sites based on the oversubscription ratio.

2. The method of claim 1, further comprising determining the oversubscription ratio based on a mean of the peak throughput values and a standard deviation of the peak throughput values of the combined voice and data traffic.

3. The method of claim 1, wherein the peak throughput values of the combined voice and data traffic over the plurality of time periods are one of weekly peak rates, daily peak rates, or hourly peak rates.

4. The method of claim 1, further comprising:
  determining an initial committed information rate for the cluster of cellular sites based on peak throughputs for individual cellular sites of the cluster of cellular sites, wherein the data associated with the throughput of the combined voice and data traffic is from a time that the virtual circuit is provisioned at the initial committed information rate.

5. The method of claim 1, further comprising:
determining an increased committed information rate for the virtual circuit, the increased committed information rate determined based on a sum of the oversubscribed committed information rate and an observed peak throughput for a new cellular site being added to the cluster of cellular sites.

6. The method of claim 5, further comprising:
receiving further data, observed at a time that the virtual circuit is provisioned with the increased committed information rate, new throughput of combined voice and data traffic of the cluster of cellular sites including the new cellular site; and
determining a new oversubscription committed information rate for the cluster of cellular sites based on new peak throughput values of the combined voice and data traffic of the cluster of cellular sites including the new cellular site.

7. The method of claim 1, further comprising:
determining a new temporary committed information rate for the cluster of cellular sites, the new temporary committed information rate determined based on a sum of the oversubscribed committed information rate and an observed increased throughput for an upgraded cellular site of the cluster of cellular sites.

8. The method of claim 7, further comprising:
receiving further data, observed at a time that the virtual circuit is provisioned with the new temporary committed information rate, new throughput of combined voice and data traffic of the cluster of cellular sites including the upgraded cellular site; and
determining a new oversubscription committed information rate for the cluster of cellular sites based on new peak throughput values of the combined voice and data traffic of the cluster of cellular sites including the upgraded cellular site.

9. A computing system, comprising:
one or more processors;
memory; and
one or more program modules stored on the memory and executable by the one or more processors to cause the computing system to:
receive data regarding throughput of combined voice and data traffic communicated via a virtual circuit between a plurality of mobile access sites and a core network; and
determine, based on peak throughput values of the combined voice and data traffic, and based on a predetermined performance threshold, an oversubscription metric for a committed information rate of the plurality of mobile access sites.

10. The computing system of claim 9, wherein the one or more program modules are further executable by the one or more processors to cause the computing system to determine the oversubscription metric based on a mean peak throughput value and a standard deviation of the peak throughput values of the combined voice and data traffic.

11. The computing system of claim 9, wherein the data regarding throughput of combined voice and data traffic was captured at a time that the virtual circuit is provisioned at an initial committed information rate.

12. The computing device of claim 9, wherein the one or more program modules are further executable by the one or more processors to cause the computing system to determine a temporary new committed information rate for the plurality of mobile access sites, the temporary new committed information rate determined based on the oversubscribed committed information rate and an observed throughput for one or more of a new mobile access site being added to the plurality of of mobile access sites or a changed one of the plurality of mobile access sites.

13. The computing device of claim 12, wherein the one or more program modules are further executable by the one or more processors to cause the computing device to:
determine a new oversubscription committed information rate for the plurality of mobile access sites based on observed new peak throughput values of the combined voice and data traffic of the plurality of mobile access sites communicated via the virtual circuit at a time that the virtual is provisioned with the temporary new committed information rate.

14. The computing device of claim 9, wherein the one or more program modules are further executable by the one or more processors to cause the computing device to:
determine an increased committed information rate for the plurality of mobile access sites, the increased committed information rate determined based on a sum of the oversubscribed committed information rate and an available or observed throughput for a new mobile access site being added to the plurality of mobile access sites.

15. The computing device of claim 14, wherein the one or more program modules are further executable by the one or more processors to cause the computing device to:
determine a new oversubscription committed information rate for the plurality of mobile access sites based on new peak throughput values of the combined voice and data traffic of the plurality of mobile access sites including the new mobile access site.

16. A method comprising:
initiating, by a computing device, provision of a virtual circuit over a backhaul network, the virtual circuit having an initial committed information rate, the virtual circuit terminating at a first user network interface (UNI) for a hub of a plurality of cellular sites and at a second UNI for a core network device;
monitoring, by the computing device, combined voice and data traffic communicated over the virtual circuit between the hub and the core network;
determining, by the computing device, an oversubscription factor for the plurality of cellular sites based at least on peak throughput values of the combined voice and data traffic over a plurality of time periods; and
initiating, by the computing device, provision of an oversubscribed committed information rate for the plurality of cellular sites based on the oversubscription factor.

17. The method of claim 16, wherein the initial committed information rate is based on a sum of committed information rates determined for each of the cellular sites within the plurality of cellular sites.

18. The method of claim 16, wherein the determining the oversubscription factor includes determining a mean peak throughput value and a standard deviation of the plurality of peak throughputs values as if the plurality of peak throughput values conform to a normal distribution.

19. The method of claim 16,
after a change to the cluster of cellular sites:
monitoring combined voice and data traffic communicated over the virtual circuit between the hub and the core network;
determining a new oversubscription factor for the virtual circuit based on new throughput peak values of the combined voice and data traffic over a plurality of time periods; and initiating provision of a new oversubscribed committed information rate for the plurality of cellular sites based on the new oversubscription factor.

20. The method of claim 16, wherein the plurality of cellular sites includes a cluster of cellular sites.

* * * * *